Figure 1:
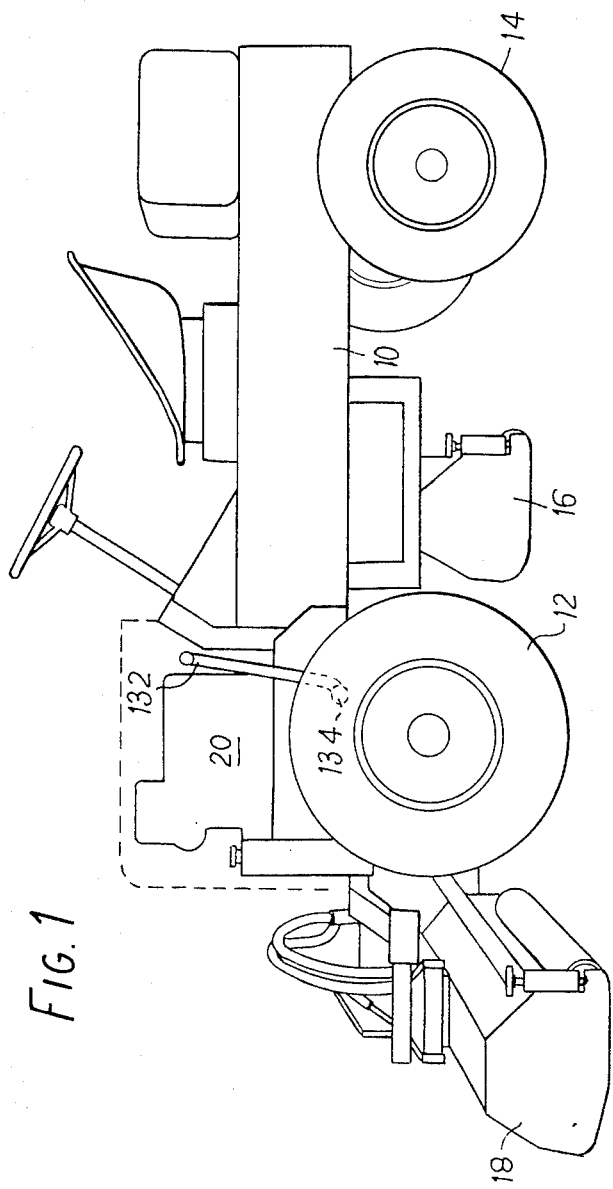

United States Patent [19]  [11] 3,960,233
Aldred  [45] June 1, 1976

[54] SPEED CONTROL MECHANISMS FOR VEHICLES

[75] Inventor: Edward John Aldred, Ipswich, England

[73] Assignee: Ransomes Sims & Jefferies Limited, Ipswich, England

[22] Filed: Mar. 18, 1974

[21] Appl. No.: 452,427

[30] Foreign Application Priority Data
Mar. 23, 1973 United Kingdom............... 14238/73

[52] U.S. Cl............................ 180/77 R; 180/82 A; 74/474
[51] Int. Cl.² ........................................ B60K 26/00
[58] Field of Search............. 180/77 R, 77 H, 82 A; 74/474, 476, 483 R, 512

[56] References Cited
UNITED STATES PATENTS

| | | | |
|---|---|---|---|
| 3,241,394 | 3/1966 | Rubenstein | 74/474 X |
| 3,354,981 | 11/1967 | Swanson | 180/77 R |
| 3,505,896 | 4/1970 | Phillips | 180/77 R X |
| 3,525,266 | 8/1970 | Brooks | 74/474 X |
| 3,528,311 | 9/1970 | Fieber | 74/474 X |
| 3,541,878 | 11/1970 | Haffner | 74/474 |
| 3,722,314 | 3/1973 | Sorenson | 74/512 |
| 3,776,325 | 12/1973 | Jesperson | 180/77 H X |

Primary Examiner—M. H. Wood, Jr.
Assistant Examiner—Terrance L. Siemens
Attorney, Agent, or Firm—Burgess Ryan and Wayne

[57] ABSTRACT

A speed control mechanism for controlling the supply of driving power to traction means of a vehicle, comprising a single control member operable by the driver of the vehicle and movable continuously over a range of positions thereby to vary the speed of the traction means or the supply of power to the traction means. A selector device which can be set by the driver to a number of positions in each of which the device acts to limit the range of movement of the control member thereby to limit the range over which the speed of the traction means can be varied, or the range of power which can be supplied to the traction means, in response to movement of the control member.

13 Claims, 8 Drawing Figures

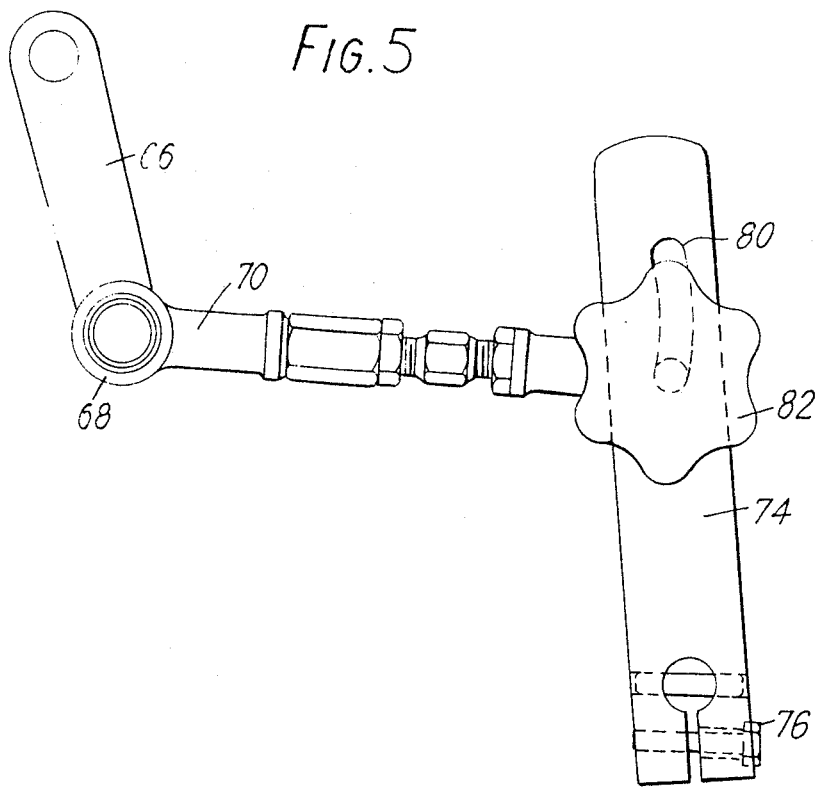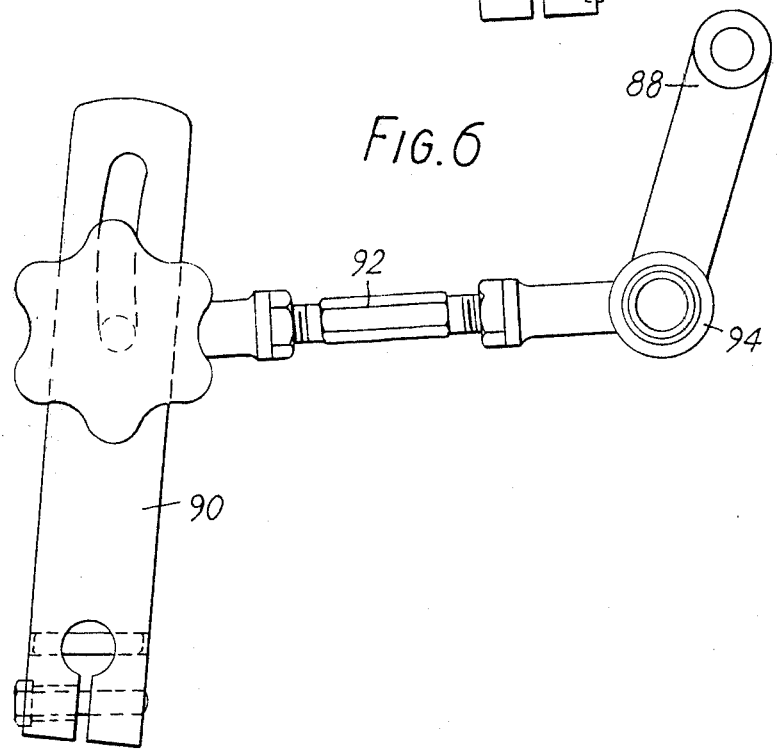

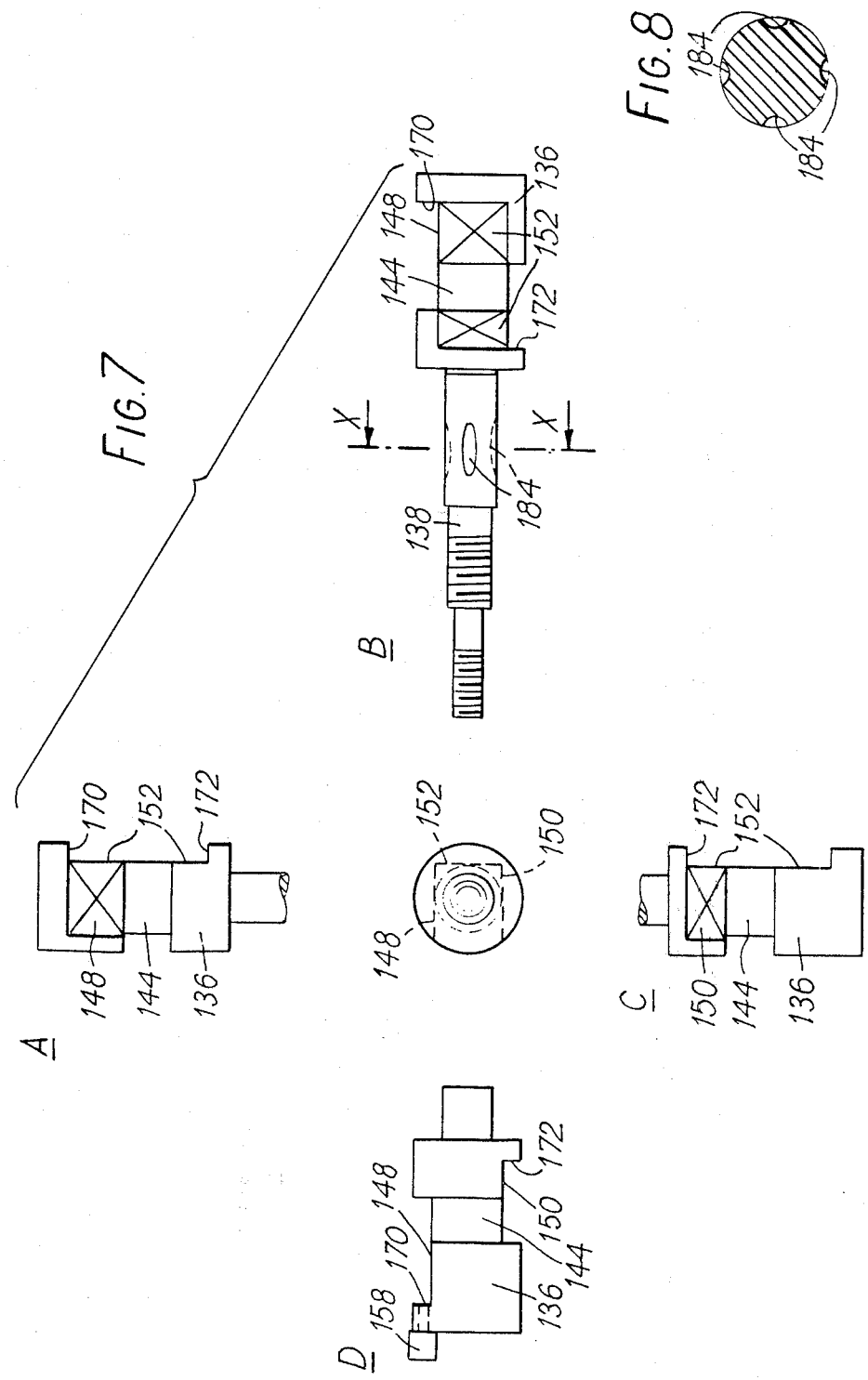

SPEED CONTROL MECHANISMS FOR VEHICLES

This invention relates to speed control mechanisms for vehicles.

According to this invention there is provided a speed control mechanism for controlling the supply of driving power to traction means of a vehicle, comprising a single control member operable by the driver of the vehicle and movable continuously over a range of positions thereby to vary the speed of the traction means or the supply of power to the tractions means, and a selector device which can be set by the driver to a number of positions in each of which the device acts to limit the range of movement of the control member thereby to limit the range over which the speed of the traction means can be varied, or the range of power which can be supplied to the traction means, in response to movement of the control member.

Preferably, the control member has a neutral position in which the supply of power to the traction means is zero, displacement of the control member in one direction from the neutral position effecting supply of power to the traction means to drive the vehicle forwards whilst displacement of the control member from the neutral position in the opposite direction effects supply of power to the traction means to drive the vehicle backwards, and the selector device has a first position in which the control member can be moved only in the said one direction from the neutral position, and a second position in which the control member can be moved only in the opposite direction. Advantageously, the selector device has a third position in which the control member is movable over its full range of movement. Suitably, the selector device has a fourth position in which the control member is held in its neutral position.

Suitably, the selector device and control member are interconnected so that the selector device can be moved from any one of its positions to another only when the control member is in its neutral position.

In the case where driving power is supplied by a prime mover in the form of an internal combustion engine having an electric starter motor, the selector device may be arranged to operate electrical switch means in such a manner that the starter motor can be energised to start the engine only when the control member is in its neutral position.

Figure 2:
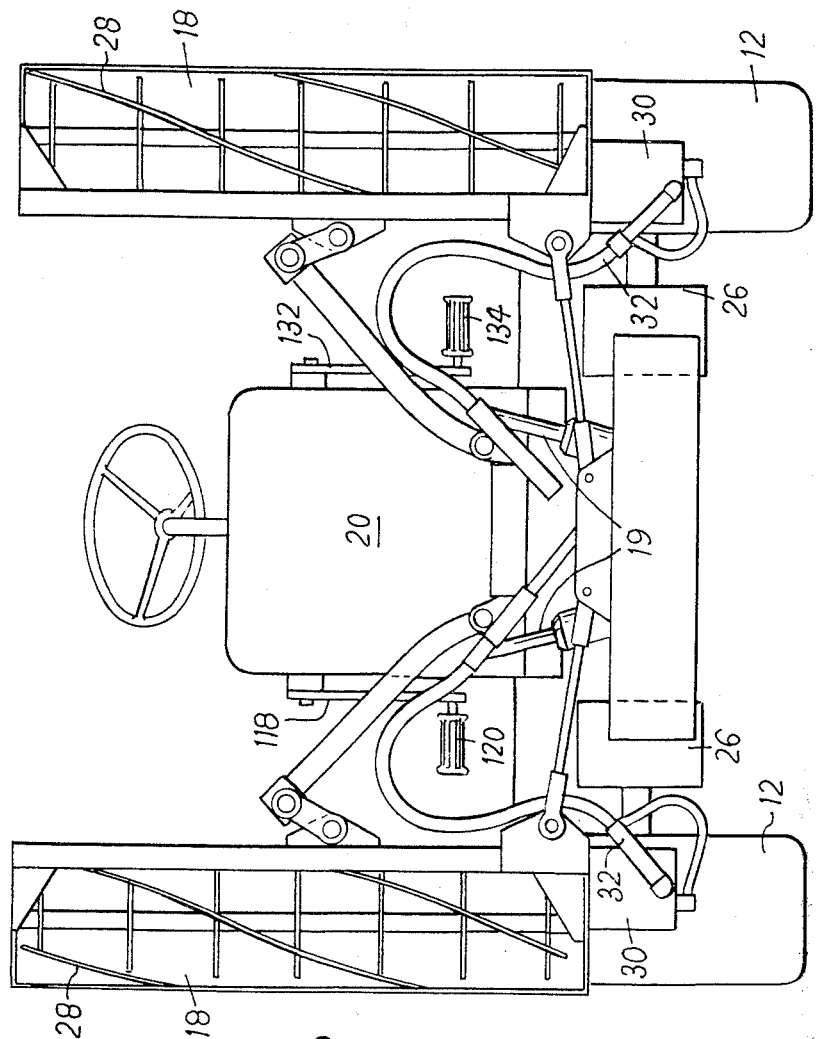
Figure 3:
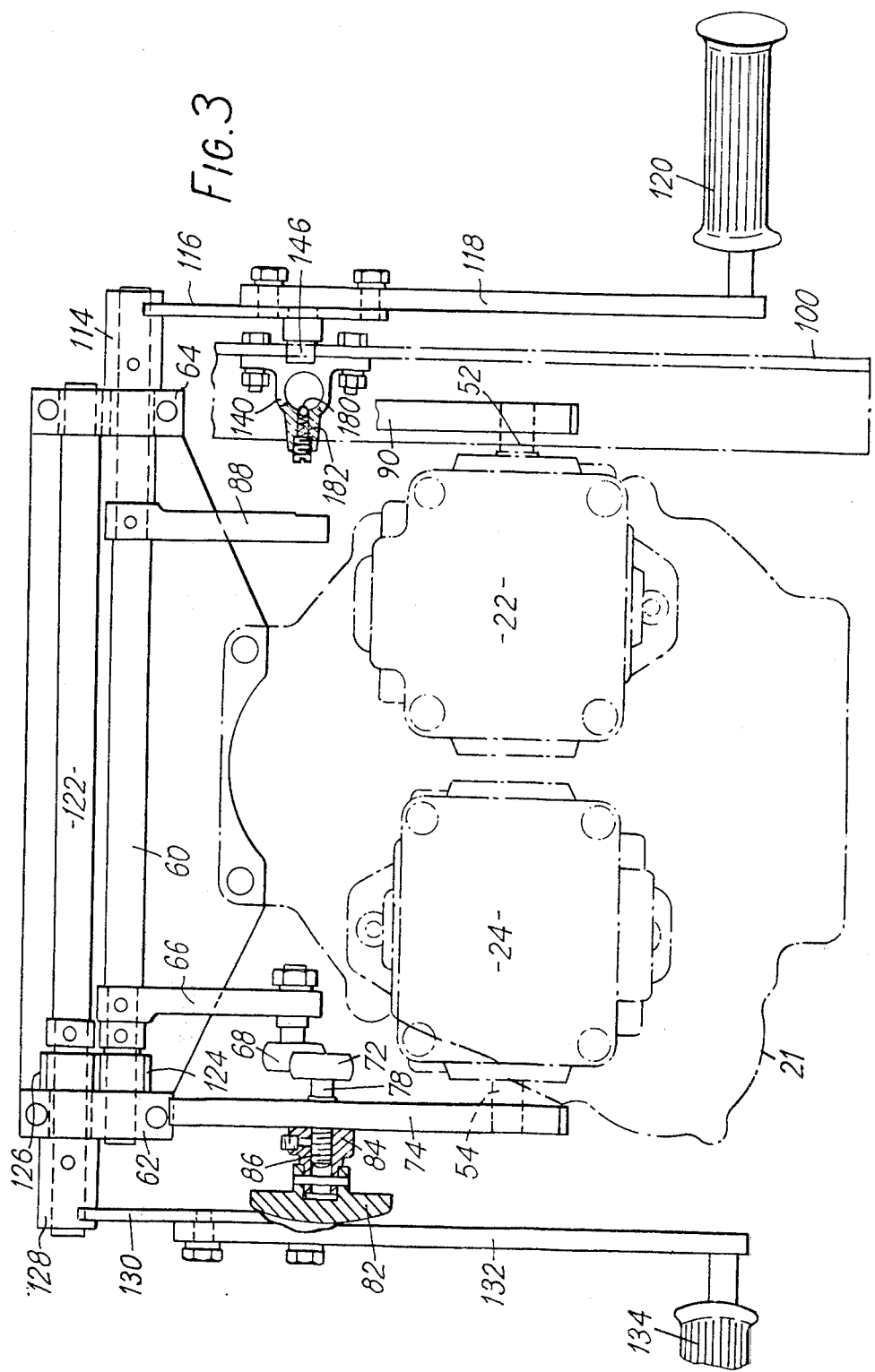
Figure 4:
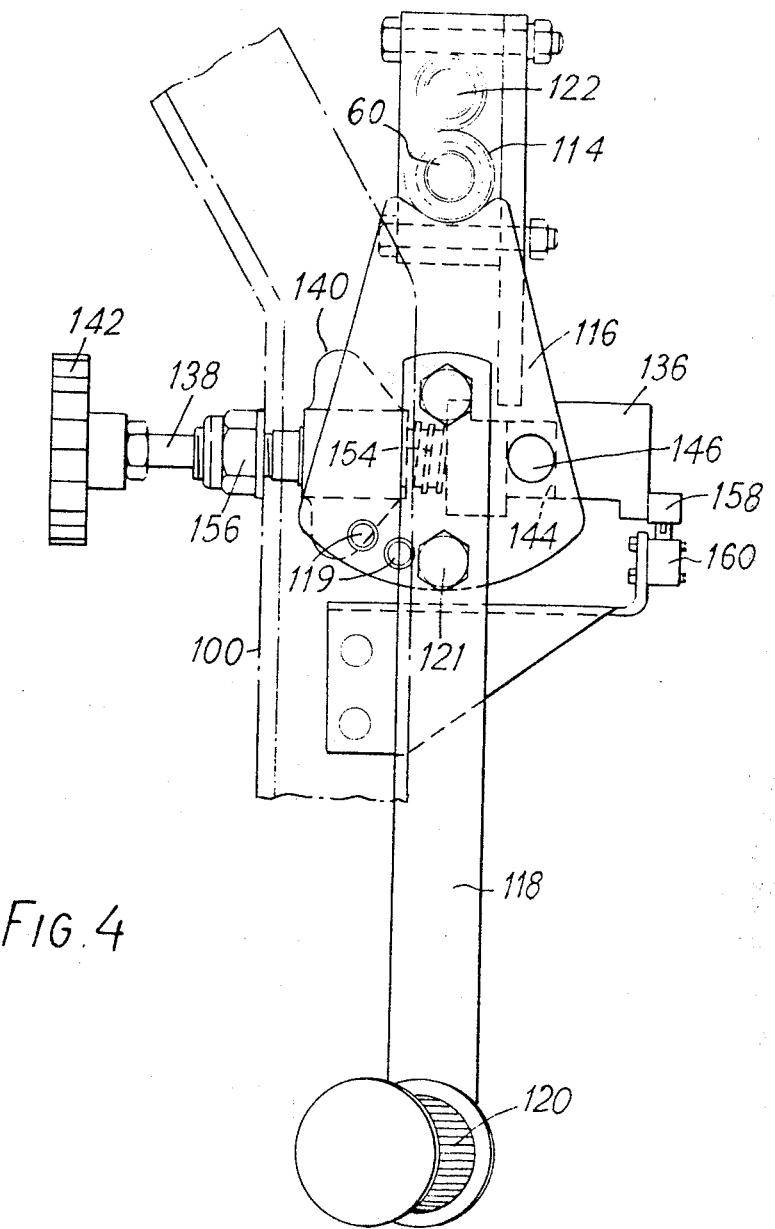

The invention will now be described, by way of example, with reference to the accompanying drawings, in which:

FIG. 1 is a diagrammatic side elevation of a gang mowing machine incorporating a speed control mechanism constructed in accordance with the present invention, FIG. 2 is a diagrammatic front elevation of the mowing machine of FIG. 1, FIG. 3 shows part of the speed control mechanism of the machine of FIGS. 1 and 2, FIG. 4 is a side elevation of the mechanism of FIG. 3, FIGS. 5 and 6 show in further detail parts of the mechanism of FIGS. 3 and 4, FIG. 7 is a composite diagram showing an end elevation and side elevations in four different orientations of part of a selector mechanism of the machine of the preceding Figures, and FIG. 8 is a section taken on line X—X of FIG. 7.

Referring to FIGS. 1 and 2, there is provided a gang mower having a chassis 10 supported on a pair of traction wheels 12 and a pair of steerable wheels 14, a center cutting unit 16 mounted on the chassis 10 between the two pairs of wheels 12 and 14, and two wing cutter units 18 mounted on the front of the chassis 10 so that they can be swung from an operative position in which they project outwards beyond the sides of the chassis, as shown in FIG. 1, to a transport position in which they are arranged vertically close to the chassis to reduce the overall width of the machine, as shown in FIG. 2.

The mower has a drive mechanism including, mounted on the chassis 10, which includes an internal combustion engine 20 which drives, through suitable gearing (not shown) in gearbox 21, a pair of variable delivery, positive displacement hydraulic pumps 22 and 24 (see FIG. 3) mounted side by side on the gearbox 21. Each traction wheel 12 is driven by a positive displacement hydraulic motor 26 connected to a hydraulic circuit associated with pump 22. The cutting cylinder 28 of each cutting unit 16 and 18 is driven by a positive displacement hydraulic motor 30 mounted on the cutting unit and connected to the hydraulic circuit of the other pump 24 through flexible conduits 32 which allow movement of the cutting units between their transport and operative positions.

The traction wheel motors 26 are connected in parallel to the pump 22, so that the wheels can rotate at different speeds to give a differential action when the machine travels around a curve. The cutting cylinder motors 30 are connected in series to the pump 24, so that the cutting cylinders are all rotated at the same speed, determined by the rate of delivery of fluid from pump 24. The hydraulic circuit of the mower includes a valve which can be set, by means of a handle operated by the driver of the machine, to a position in which the cylinder motors 30 are placed in a freewheel condition, whilst the output of pump 24 is diverted to the traction motors 26, which therefore receive the outputs of both pumps 22 and 24 to give a high speed drive during transport of the mower.

Each of the pumps 22 and 24 is a variable-delivery, axial-flow swashplate pump, whose rate of delivery is adjustable by means of a rotatable control shaft (52 on pump 22 and 54 on pump 24, see FIG. 3). The rate of delivery of each pump is proportional to the angular displacement of the control shaft from a neutral position in which the rate of delivery is zero, displacement of the control shaft in one sense causing delivery of fluid in one direction and displacement of the shaft in the opposite sense causing reversal of the fluid flow.

A main control shaft 60 is rotatably mounted above pumps 22 and 24, in bearing blocks 62 and 64 fixed to chassis 10, the axis of shaft 60 being horizontal and lying perpendicular to the fore-and-aft axis of the mowing machine. Fixed to shaft 60 near one end of the shaft is a lever arm 66, the free end of which is connected through a ball-joint 68 to one end of an adjustable-length link 70 (FIG. 5). The other end of link 70 is connected through a ball-joint 72 to a lever 74 which is clamped by means of clamping screw 76 to the control shaft 54 of pump 24. The ball-joint 72 is carried by a shaft 78 which is slidable in an arcuate slot 80 machined in lever 74 so that the position of the ball-joint 72 on lever 74 can be adjusted. After adjustment the ball-joint is clamped in position by means of a handwheel 82 which turns a collar 84 engaging a threaded part 86 of shaft 78, The levers 66 and 74 and link 70 thus provide a linkage between the main control shaft 60 and the control shaft 54 of pump 24 so that rotation of main control shaft 60 in either direction effects rotation in the same direction of pump control shaft 54. Adjustment of the position of ball-joint 72 relative to lever 74 varies the effective length of lever 74 and thus varies the degree of rotation of the pump control shaft 54 produced by a given angular movement of main control shaft 60.

The control shaft 52 of pump 22 is also connected to the main control shaft 60 through a similar linkage, consisting of a lever arm 88 fixed to main control shaft 60, a lever arm 90 clamped to pump control shaft 52, and an adjustable length link 92 (FIG. 6) connected between ball-joints on levers 88 and 90, the position of the ball-joint on lever 90 being adjustable to adjust the effective length of lever 90. The link and ball-joints are omitted from FIG. 3 for the sake of clarity.

Fixed to the right-hand end of the main control shaft 60 is a sleeve 114, to which is welded a quadrant plate 116. Bolted to quadrant 116 is a pedal lever 118, the lower end of which carries a pedal 120. The pedal is positioned so that it can be pushed forward by the right foot of the driver of the machine when he is seated on seat 15 (see FIGS. 1 and 2). The quadrant plate 116 is formed with three spaced holes 119 to which the lowermost fixing bolt 121 can be fitted, to enable the pedal to be fitted suitably in a selected one of three different positions. As shown in FIG. 4, one of the holes 119 is occupied by bolt 121. A second control shaft 122 is rotatably carried, in the bearing blocks 62 and 64, above and parallel to the main control shaft 60. The shafts 60 and 122 are connected by intermeshing pinions 124 and 126 so that rotation of one shaft in one sense will produce a rotation in the opposite sense of the other shaft. Fixed to the left-hand end of shaft 122 is a sleeve 128 to which is welded a plate 130. Bolted to plate 130 is a lever 132 carrying at its lower end a pedal 134, positioned so that it can be operated by the left foot of the driver of the machine.

The control mechanism is arranged so that when the two pedals 120 and 134 are in a neutral position, with the two pedals at similar longitudinal positions on the two sides of the chassis 10, then the control shafts 52 and 54 of pumps 22 and 24 are in their neutral positions so that the fluid flow from each pump is zero. A fine adjustment of the settings of the control shafts 52 and 54 can be effected by adjusting the lengths of the links 70 and 92 (FIGS. 5 and 6). If the pedal 120 is pushed forwards by the right foot of the driver, the control shaft 52 of pump 22 is rotated to cause delivery of fluid to the traction wheel motors 26 to cause forward movement of the machine. At the same time, pedal 134 is moved backwards by rotation of shaft 122. If pedal 134 is then pushed forwards by the left foot of the driver, shaft 122 is rotated and causes rotation in the opposite sense of the main control shaft 60, so that the control shafts of the pumps are rotated in the opposite direction, and at the same time pedal 120 is moved backwards. If pedal 134 is pushed forwards beyond the neutral position, the flow of fluid from the pumps 22 and 24 will be reversed so as to reverse the direction of travel of the machine.

FIG. 4 shows a selector assembly which allows the driver to set limits on the movements of pedals 120 and 134 during various operations of the machine. The selector assembly comprises a selector element 136 formed at one end of a horizontal shaft 138 rotatably carried in a bearing 140 fixed to a frame member 100 of the machine. The shaft 138 extends parallel to the fore-and-aft axis of the machine between pedal lever 118 and the body of pump 22. The shaft 138 can be rotated by means of a handwheel 142. The selector element 136 lies adjacent the quadrant plate 116 and is formed with an annular groove 144 which can receive a pin 146 fixed to plate 116. The arrangement is such that when pin 146 is engaged in groove 144 the pedal lever 118 is in its neutral position. The sleeve is formed with three flats 148, 150 and 152 arranged at 90° to one another (see FIGS. 4 and 7) so that they can be brought in turn to face the quadrant plate 116, in which position the pin 146 can move freely across the adjacent flat. Flat 148 is on the forward side of groove 144, so that with the shaft 138 orientated as illustrated at A in FIG. 7, the pedal lever 118 can move forwards from its neutral position but is prevented from moving rearwards from its neutral position by engagement of pin 146 with the side of groove 144. Flat 152 extends on both sides of groove 144, so that with shaft 138 orientated as shown at B in FIG. 7 the pedal lever 118 can move freely over its full range of movement. Flat 150 extends rearwardly from groove 144, so that with shaft 138 orientated as shown at C in FIG. 7, the pedal lever 118 can move rearwardly from its neutral position. When the shaft 138 is orientated as shown at D in FIG. 7, pedal lever 118 is held in its neutral position. To hold the shaft 138 in each of the four positions there is provided on bearing 140 a spring-loaded catch consisting of a ball 180 (FIG. 3) biased by a spring 182 into engagement with one of four recesses 184 (FIGS. 7 and 8) formed in shaft 138.

The shaft 138 has a small degree of freedom of longitudinal movement in bearing 140, to allow the driver, when the selector holds the pedals in their neutral position, to move the pedals slightly to correct any creep of the traction motors. The shaft is biased to its forward position by a compression spring 154 acting between the element 136 and the bearing 140, and its freedom of movement is limited by nut 156 fitted onto a threaded part 157 of shaft 138 and abutting frame member 100.

A cam 158 fixed to the forward end of the shaft 138 engages and closes a microswitch 160 when the shaft is orientated to hold the pedals in their neutral position. Switch 160 is so connected in the electrical circuit of the machine that the engine starter motor can only be operated when the switch is closed i.e. when the pedals are in the neutral position. It will be apparent that selector shaft 138 can only be rotated when the pedals are in the neutral position.

When the selector assembly is set so that the pedal lever 118 can only move forwards from its neutral position, the driver of the machine has control through the pedals 120 and 134 of the forward speed of the machine over its full range of speed, but cannot push the left-hand pedal 134 forwards beyond its neutral position to reverse the direction of travel of the machine. There is therefore no danger of throwing the machine accidentally in reverse. This is especially useful when the machine is being driven, in its transport condition, in traffic on public roads. Similarly, the selector assembly can be set to enable only reverse travel of the machine, or can be set to allow both forward and reverse travel to be obtained under the control of the pedals alone. An end stop 170 formed at the forward ends of flats 148 and 152 acts to limit the forward movement of pedal 120 and thus prevents pressure exerted on the pedal during maximum speed forward travel from being transmitted to the pump control shafts 52 and 54. Similarly an end stop 172 formed at the rear ends of flats 150 and 152 limits backwards movement of pedal 120 to set a limit to the maximum reverse speed of the machine.

The control of the pumps 22 and 24 by means of two pedals, the pedal operated by the driver's right foot being pushed forwards to increase the forward speed or decrease the reverse speed of the machine, and the pedal operated by the driver's left foot being pushed forwards to decrease the forward speed or increase the reverse speed of the machine, allows the driver to control quickly and easily the driving power supplied to the traction motors and cylinder and so gives great maneouvrability to the machine.

It will be appreciated that the present invention could be applied to vehicles other than the mowing machine described, and that other forms of drive means could be employed, e.g., a battery powered d.c. series motor, the pedals operating through suitable control circuitry to vary the power supplied by the motor to the traction wheels.

I claim:

1. A speed control mechanism for controlling the supply of driving power to traction means of a vehicle, comprising means for supplying power to the traction means, a control member movably mounted on the vehicle and operable by the driver of the vehicle, said control member being movable continuously over a range of positions for varying the speed of the traction means or varying the supply of power to the traction means, and a selector means for limiting the movement of said control member, said selector means being movable between a plurality of different positions for limiting the range of movement of the control member to thereby limit the range over which the speed of the traction means can be varied, or the range of power which can be supplied to the traction means, in response to movement of the control member, in which the selector means and control member are interconnected, said control member having a neutral position in which said selector means and said control member are not inter-connected, said selector means being movable from any one of its positions to another only when said control member is in its neutral position.

2. A speed control mechanism as claimed in claim 1, in which said control member is movable between a neutral position in which the supply of power to the traction means is zero, and two additional positions one on each side of said neutral position, displacement of the control member from neutral position to one of said additional positions effecting supply of power to the traction means to drive the vehicle forwards whilst displacement of the control member from the neutral position toward the other additional position effects supply of power to the traction means to drive the vehicle backwards, said selector means having a first position for limiting movement of the control member in only one direction from the neutral position, and a second position in which the control member can be moved only in the opposite of said one direction.

3. A speed control mechanism as claimed in claim 2, in which the selector means has a third position in which the control member is movable between said two additional positions.

4. A speed control mechanism as claimed in claim 3, in which the selector means has a fourth position for retaining the member in its neutral position.

5. A speed control mechanism as claimed in claim 2, in which driving power is supplied to the traction means by an internal combustion engine having an electric starter motor, electrical switch means for permitting said engine to start, and means mounted on said selector means for deactivating said switch means and preventing said motor from starting when said control member is in a position other than the neutral position and the selector device is arranged to operate electrical switch means in such a manner that the starter motor can be energized only when the control member is in its neutral position.

6. A speed control mechanism as claimed in claim 1, in which the selector means includes a selector element manually rotatable between a plurality of orientations, each orientation corresponding to one of the said positions of the selector means, and a co-operating element movable with the control member and engaging the selector element, said selector element having a plurality of abutment surfaces thereon for defining the range of movement of the control member, the co-operating element being movable relative to the selector element between the abutment surfaces formed on the selector element and defining the range of movement of the control member.

7. A speed control mechanism for controlling the supply of driving power to traction means of a vehicle, comprising a single control member operable by the driver of the vehicle and movable continuously over a range of positions including a neutral position, for varying the speed of the traction means or the supply of power to the traction means, and a selector device which can be set by the driver to a number of positions in each of which the selector device acts to limit the range of movement of the control member to thereby limit the range over which the speed of the traction means can be varied, or of power which can be supplied to the traction means in response to movement of the control member, said selector device comprising a selector element manually rotatable between a plurality of orientations, each orientation corresponding to one of said positions of the selector device, and a co-operating element movable with the control member and engaging the selector element whereby, in each of the orientations of the selector element, the co-operating element can move relative to the selector element between the abutment surfaces formed on the selector element and defining the range of movement of the control member, said co-operating element comprising a pin engaging an annular groove in said selector element when the control member is in its neutral position, said selector element having a plurality of flat faces extending from said groove and arranged whereby, in at least one orientation of the selector element, the pin can move out of the groove over an adjacent flat face to allow movement of the control member from its neutral position.

8. A speed control mechanism for controlling the supply of driving power to traction means of a vehicle, comprising means for supplying power to the traction means, a single control member movably mounted on the vehicle and coupled to a pedal operable by the driver of the vehicle, said control member being movable by said pedal continuously over a range of positions for varying the speed of the traction means or varying the supply of power to the traction means, and a selector means for limiting the movement of said control member, said selector means being movable between a plurality of different positions for limiting the range of movement of the control member to thereby limit the range over which the speed of the traction means can be varied, or the range of power which can be supplied to the traction means, in response to movement of the control member.

9. A speed control mechanism for controlling the supply of driving power to traction means of a vehicle, comprising a control member movable continuously over a range of positions thereby to vary the supply of power to the traction means, the control member being movable by means of two pedals positioned so that they can be simultaneoulsy engaged respectively by the right and left foot of the driver of the vehicle, the pedals being interconnected so that movement of either pedal in one direction under pressure of the driver's foot causes the other pedal to move in the opposite direction, the control member and the pedals having a neutral position in which the driving power supplied to the traction means is zero, so that movement of one pedal, under pressure of the driver's foot, beyond the neutral position causes movement of the control member such that power is supplied to the traction means to drive the vehicle forwards, whilst movement of the other pedal, under pressure of the driver's foot, beyond the neutral position causes movement of the control member such that power is supplied to the traction means to drive the vehicle backwards, and a selector device which can be placed in any one of a plurality of discrete settings and is movable by the driver from one to another of the settings, the selector device in each setting limiting the range over which the supply of power to the traction means can be varied by movement of the control member, and the settings including a first setting in which the said range is limited to that corresponding to movement of the control member which causes power to be supplied to the traction means to drive the vehicle forwards.

10. A speed control mechanism as claimed in claim 9, in which the selector device in each of the said settings limits the range of movement of the control member, thereby to limit the range over which the speed of the traction means or supply of power to the traction means can be varied, the device in its said first setting allowing movement of the control member only in the said one direction.

11. A speed control mechanism as claimed in claim 10, in which the selector device has a further setting in which the control member is movable only in the said other direction.

12. A speed control mechanism for controlling the supply of driving power to traction means of a vehicle, comprising a single control member operable by the driver of the vehicle and movable continuously over a range of positions thereby to vary the speed of the traction means or the supply of power to the traction means, the control member having a neutral position in which the supply of power to the traction means is zero, displacement of the control member in one direction from the neutral position effecting supply of power to the traction means to drive the vehicle forwards whilst displacement of the control member from the neutral position in the opposite direction effects supply of power to the traction means to drive the vehicle backwards, and a selector device comprising a single manually operable selector element which can be placed by the driver in one of a number of discrete settings in each of which the element acts to limit the range of movement of the control member thereby to limit the range over which the speed of the traction means can be varied, or the range of power which can be supplied to the traction means, in response to movement of the control member, the settings including at least a first setting in which the control member is movable by the driver in both directions from the neutral position and can be moved through the neutral position in a single continuous movement, and a second setting in which the control member can be moved only in the said one direction from the neutral position.

13. A control mechanism as claimed in claim 12, in which the selector element has a further setting in which the control member can be moved only in the said opposite direction from the neutral position.

* * * * *